(12) United States Patent
Boyer (10) Patent No.: US 11,128,140 B2
(45) Date of Patent: Sep. 21, 2021

(54) AUTOMATIC SWITCH FOR SINGLE- OR SPLIT-PHASE AC ELECTRICAL POWER

(71) Applicant: A. M. Solar, Inc., Springfield, OR (US)

(72) Inventor: Mitchell J. Boyer, Eugene, OR (US)

(73) Assignee: A. M. SOLAR, INC., Springfield, OR (US)

( * ) Notice: Subject to any disclaimer, the term of this patent is extended or adjusted under 35 U.S.C. 154(b) by 0 days.

(21) Appl. No.: 16/994,571

(22) Filed: Aug. 15, 2020

(65) Prior Publication Data
US 2021/0066922 A1    Mar. 4, 2021

Related U.S. Application Data

(60) Provisional application No. 62/893,161, filed on Aug. 28, 2019.

(51) Int. Cl.
*H02J 3/38* (2006.01)

(52) U.S. Cl.
CPC ........... *H02J 3/381* (2013.01); *H02J 2300/24* (2020.01)

(58) Field of Classification Search
CPC ........ H02J 3/381; H02J 2300/24; H02J 9/062; Y02E 10/56
See application file for complete search history.

(56) References Cited

U.S. PATENT DOCUMENTS

2008/0203820 A1 *   8/2008   Kramer ..................... H02J 3/40
                                                              307/64

* cited by examiner

*Primary Examiner* — Toan T Vu
(74) *Attorney, Agent, or Firm* — David S. Alavi (57) ABSTRACT

A switching apparatus has: first line, second line, neutral, and ground inputs; first line, second line, neutral, and ground outputs; inverter line, inverter neutral, and inverter ground inputs; inverter line, inverter neutral, and inverter ground outputs; electrical relays; and a control circuit. The first line and neutral inputs are connected to the inverter line and inverter neutral inputs, respectively; the inverter line output is connected to the first line output. With power only from the inverter output, or with single-phase power on the inverter line output and second line input, the inverter line and inverter neutral outputs are connected to the first line and neutral outputs, respectively, using the relays and control circuit. With split-phase power on the invert line output and second line input, the second line and neutral inputs are connected to the second line and neutral outputs, using the relays and control circuit.

29 Claims, 6 Drawing Sheets

AUTOMATIC SWITCH FOR SINGLE- OR SPLIT-PHASE AC ELECTRICAL POWER

CROSS-REFERENCE TO RELATED APPLICATION

This application claims benefit of U.S. provisional App. No. 62/893,161 entitled "Automatic switch for single- or split-phase AC electrical power" filed Aug. 28, 2019 in the name of Mitchell J. Boyer, said provisional application being hereby incorporated by reference as if set forth herein in its entirety.

FIELD OF THE INVENTION

The field of the present invention relates to AC electrical power systems (i.e., alternating-current electrical power systems). In particular, apparatus and methods are described herein for automatic switching of single- or split-phase AC electrical power.

SUMMARY

An inventive electrical switching apparatus comprises: first line, second line, neutral, and ground input connections; first line, second line, neutral, and ground output connections; line, neutral, and ground inverter input connections; line, neutral, and ground inverter output connections; one or more electrical relays; and a control circuit. The input, output, inverter input, and inverter output ground connections are all connected together; the first line and neutral input connections are connected to the inverter line and neutral input connections, respectively. The one or more electrical relays are structured and connected so as to be switchable, in response to a primary control signal, between at least a parallel-connected state and a cross-connected state. With the relays in the cross-connected state, the relays (i) connect the inverter line output connection to the first line output connection, (ii) connect the inverter line output connection to the second line output connection, (iii) connect the inverter neutral output connection to the neutral output connection, and (iv) isolate the second line input connection from the second line output connection. With the relays in the parallel-connected state, the relays (i) connect the inverter line output connection to the first line output connection, (ii) connect the second line input connection to the second line output connection, (iii) connect the neutral output connection to the neutral input connection or to the inverter neutral connection, and (iv) isolate the first line output connection from the second line output connection.

The control circuit is structured, programmed, and connected (i) to detect or measure AC voltages between and on each of the inverter line output connection and the second line input connection, and (ii) based on the measured or detected AC voltages and in the absence of any over-riding control signal, to set automatically the primary control signal at a corresponding signal level. If power is available on the inverter line output connection but not on the second line input connection, the primary control signal level is set automatically so that the relays automatically remain in or are automatically switched to the cross-connected state. If AC power is available on both the inverter line output connection and the second line input connection and their respective AC voltages are in phase, the primary control signal is set automatically so that the relays automatically remain in or are automatically switched to the cross-connected state. If AC power is available on both the inverter line output connection and the second line input connection and their respective AC voltages are in antiphase, the primary control signal is set automatically so that the relays automatically remain in or are automatically switched to the parallel-connected state.

Objects and advantages pertaining to AC electrical power systems may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or appended claims.

DETAILED DESCRIPTION OF EMBODIMENTS

In the United States and elsewhere electrical power is delivered via the electrical grid (therefore also referred to as grid power) to residential and commercial locations as so-called split-phase AC power, in which four wires carry AC electrical power: a first line, a second line, a neutral, and a ground. The line wires are sometimes also referred to as hot or active, because when delivering power they have nonzero AC voltages, whereas the neutral and ground wires are nominally always at ground potential. In a split-phase system, the first and second line wires each carry nominally the same nonzero AC voltage (e.g., about 110 to 120 AC volts at about 50 to 60 Hz in the U.S.; RMS values are assumed for any AC voltages specified herein) and are in antiphase (i.e., about 180° out of phase) with respect to one another. Upon reaching a given delivery point (e.g., a residence or business), the four wires are connected to one or more AC power distribution panels, which in turn are connected to one or more circuits at the delivery point. Typically the ground and neutral wires are connected together at a main distribution panel (to which additional panels, if present, are connected). Most circuits are so-called single-pole circuits that are connected the ground, the neutral, and only one of the lines. In the U.S. such a single-pole circuit delivers about 110 to 120 AC volts to devices connected to the circuit. AC current flows through the line and neutral wires of each single-pole circuit; little or no current is intended to flow through the ground wire of each circuit, and typically significant current flow through the ground wire occurs only when there is some sort of fault or short circuit present. Some other circuits are so-called two-pole circuits that are connected to the ground and both lines; AC current flows through the two line wires, and little or no current is intended to flow through the ground wire in the absence of a fault or short circuit. A two-pole circuit can deliver twice the AC voltage to a connected device, e.g., about 220 to 240 AC volts in the U.S.; higher power devices such as HVAC equipment, kitchen appliances, or laundry appliances are often connected to a two-pole circuit. Each circuit, whether single-pole or two-pole, is typically protected by a circuit breaker or other fault-protection device in the corresponding distribution panel.

The arrangement described above is adequate for power delivery to fixed locations through a functioning electrical grid. The situation becomes more complex when generators, batteries, or solar panels are introduced. Such alternative power sources are useful for providing power when not connected to the electric grid (e.g., for a recreational vehicle (RV) or a boat), when grid power is interrupted, or when one wishes to use solar power (whether connected to the grid or not). Each differs from grid power in important ways. While a generator can be arranged to produce split-phase AC power functionally equivalent to grid power, a more common arrangement is for the generator to produce single-phase AC power in which AC voltages on the two line wires are in phase with respect to one another. Batteries and solar panels are DC (direct-current) electrical power sources, so that an inverter is required to produce the AC electrical power needed to power most devices (or to charge batteries using AC grid or generator power); such inverters typically interact properly with only single-phase AC power. A common wiring arrangement in a boat or RV includes the inverter connected in series into only one of the line wires (along with the neutral and ground wires), so that when relying on battery or solar panel power from the inverter, any circuits connected to the other line wire are without power.

It would be desirable to provide an inventive electrical switching apparatus that enables all circuits of a building, house, vehicle, or boat to receive AC power regardless of whether that AC power comes from the electrical grid, from a generator, or from an inverter, and switches automatically between different connection arrangements to achieve that result based on which power source is in use. Examples of such an inventive electrical switching apparatus 100 are illustrated schematically in FIGS. 1A-1C and 2A-2C.

An inventive electrical switching apparatus 100 comprises: first line, second line, neutral, and ground input connections 11/12/13/19; first line, second line, neutral, and ground output connections 41/42/43/49; line, neutral, and ground inverter input connections 21/23/29; line, neutral, and ground inverter output connections 31/33/39; one or more electrical relays 110; and a control circuit 120. The input, output, inverter input, and inverter output ground connections 19/29/39/49 are all connected together; some of those connections might be indirect (e.g., through common connections to a chassis or housing). The first line and neutral input connections 11/13 are connected to the inverter line and neutral input connections 21/23, respectively. The one or more electrical relays 110 are structured and connected so as to be switchable, in response to a primary control signal 99, between at least a cross-connected state and a parallel-connected state. With the relays 110 in the cross-connected state (e.g., as in FIGS. 1A and 2A), the relays 110 (i) connect the inverter line output connection 31 to the first line output connection 41, (ii) connect the inverter line output connection 31 to the second line output connection 42, (iii) connect the inverter neutral output connection 33 to the neutral output connection 43, and (iv) isolate the second line input connection 12 from the second line output connection 42. With the relays 110 in the parallel-connected state (e.g., as in FIGS. 1B and 2B), the relays 110 (i) connect the inverter line output connection 31 to the first line output connection 41, (ii) connect the second line input connection 12 to the second line output connection 42, (iii) connect the neutral output connection 43 to the neutral input connection 13 or to the inverter neutral output connection 33 (connection to the neutral input connection 13 is typically preferred), and (iv) isolate the first line output connection 41 from the second line output connection 42.

The control circuit 120 is structured, programmed, and connected (i) to detect or measure AC voltages between and on each of the inverter line output connection 31 and the second line input connection 12, and (ii) based on the measured or detected AC voltages and in the absence of any over-riding control signal 97/98, to set automatically the primary control signal 99 at a corresponding signal level. If power is available on the inverter line output connection 31 but not on the second line input connection 12 (e.g., running on only battery or solar power, with no grid or generator power available), the primary control signal level is set automatically so that the relays 110 automatically remain in or are automatically switched to the cross-connected state (e.g., as in FIGS. 1A and 2A). If AC power is available on both the inverter line output connection 31 and the second line input connection 12 and their respective AC voltages are in phase (i.e., have a relative phase of about 0°; e.g., running on single-phase generator or grid power), the primary control signal is set automatically so that the relays 110 automatically remain in or are automatically switched to the cross-connected state (e.g., as in FIGS. 1A and 2A). If AC power is available on both the inverter line output connection 31 and the second line input connection 12 and their respective AC voltages are in antiphase (i.e., have a relative phase of about 180°; e.g., running on split-phase grid or generator power), the primary control signal is set automatically so that the relays 110 automatically remain in or are automatically switched to the parallel-connected state (e.g., as in FIGS. 1B and 2B).

When the inventive switching apparatus 100 is in use, the inverter line, neutral, and ground input connections 21/23/29 and the inverter line, neutral, and ground output connections 31/33/39 are connected to corresponding input and output connections of an inverter 300, typically a pass-through inverter, and can be of any suitable type or arrangement. The inverter 300 typically is also connected to one or more sources of DC power, such as one or more batteries or one or more solar panels. The inverter can be structured and connected to perform one or more of the following functions: (i) receive AC power from the line input connection 11 through the inverter input connection 21 and transmit that AC power from the inverter output connection 31; (ii) augment the transmitted AC power with power from batteries or solar cells if the received AC power is insufficient; (iii) charge batteries if excess received AC power is available; (iv) provide AC power through the inverter output connection 31 entirely from batteries or solar cells when AC power is unavailable from the line input connection 11.

When the inventive switching apparatus 100 is in use, the first line, second line, neutral, and ground output connections 41/42/43/44 are connected to corresponding connections of one or more AC power distribution panels 400. In some examples, both the first and second line output connections 41/42 are connected to each panel (along with the neutral and ground output connections 43/44). In other examples, the one or more panels 400 include two subsets of functionally distinct panels. Panels of both subsets are connected to the neutral and ground output connections 43/44; panels of one subset are connected to the first line output connection 41, while panels of the other subset are connected to the second line output connection 42.

The inventive electrical switching apparatus 100 can be constructed in any suitable way and in any suitable arrangement. A common arrangement includes some sort of chassis or housing or both; typically such a chassis or housing is connected to at least one of the ground connections. For purposes of the present disclosure or appended claims, the term "connection" shall denote any suitable combination or arrangement of electrically conductive elements adequate to deliver AC electrical power. Examples of a suitable connection typically will include one or more lengths of wire, cable, busbar, or other conductor terminated or connected in any suitable way, e.g., by a screw terminal, clamp, plug, socket, splice, solder connection, and so forth. For example, the first line, second line, neutral, and ground input connections 11/12/13/19 can in some instances comprise wiring within the inventive switching apparatus 100 that terminates in a socket accessible from outside a housing that encloses the inventive switching apparatus 100. In other instances those connections 11/12/13/19 can comprise unterminated wires emerging from the housing that are intended to be wired directly into, e.g., a transfer switch 200 or an external AC power source. In still other instances those connections 11/12/13/19 can comprise unterminated wires, screw terminals, solder pads, clamps, or other structures arranged so as to enable unterminated wires from, e.g., the transfer switch 200 or external AC power source that enter the housing to be wired directly into the inventive switching apparatus 100. Similarly, the first line, second line, neutral, and ground output connections 41/42/43/49 can in some instances comprise wiring within the inventive switching apparatus 100 that terminates in a socket accessible from outside the housing. In other instances those connections 41/42/43/49 can comprise unterminated wires emerging from the housing that are intended to be wired directly into, e.g., one or more power distribution panels 400. In still other instances those connections 41/42/43/49 can comprise unterminated wires, screw terminals, solder pads, clamps, or other structures arranged so as to enable unterminated wires from, e.g., one or more panels 400 that enter the housing to be wired directly into the inventive switching apparatus 100.

The control circuit can be of any suitable type or arrangement, and can include any suitable combination of one or more passive components (e.g., resistors, capacitors, inductors, and so forth), active components (e.g., diodes, transistors, operational amplifiers, integrated circuits, programmable logic devices, and so forth), computer components (processors, memory, storage, A/D or D/A converters, and so forth) connected by, e.g., wiring, cabling, breadboard, circuit board, communications bus, and so forth. The control circuit 120 can be programmed by hard wiring of components in a suitable corresponding arrangement, or, if the control circuit 120 includes computer components, by execution of suitable software or firmware. In a common arrangement, the control circuit 120 is structured and connected so as to draw power from the inverter line output connection 31; other suitable power sources for the control circuit 120 can be employed.

Figure 1A:
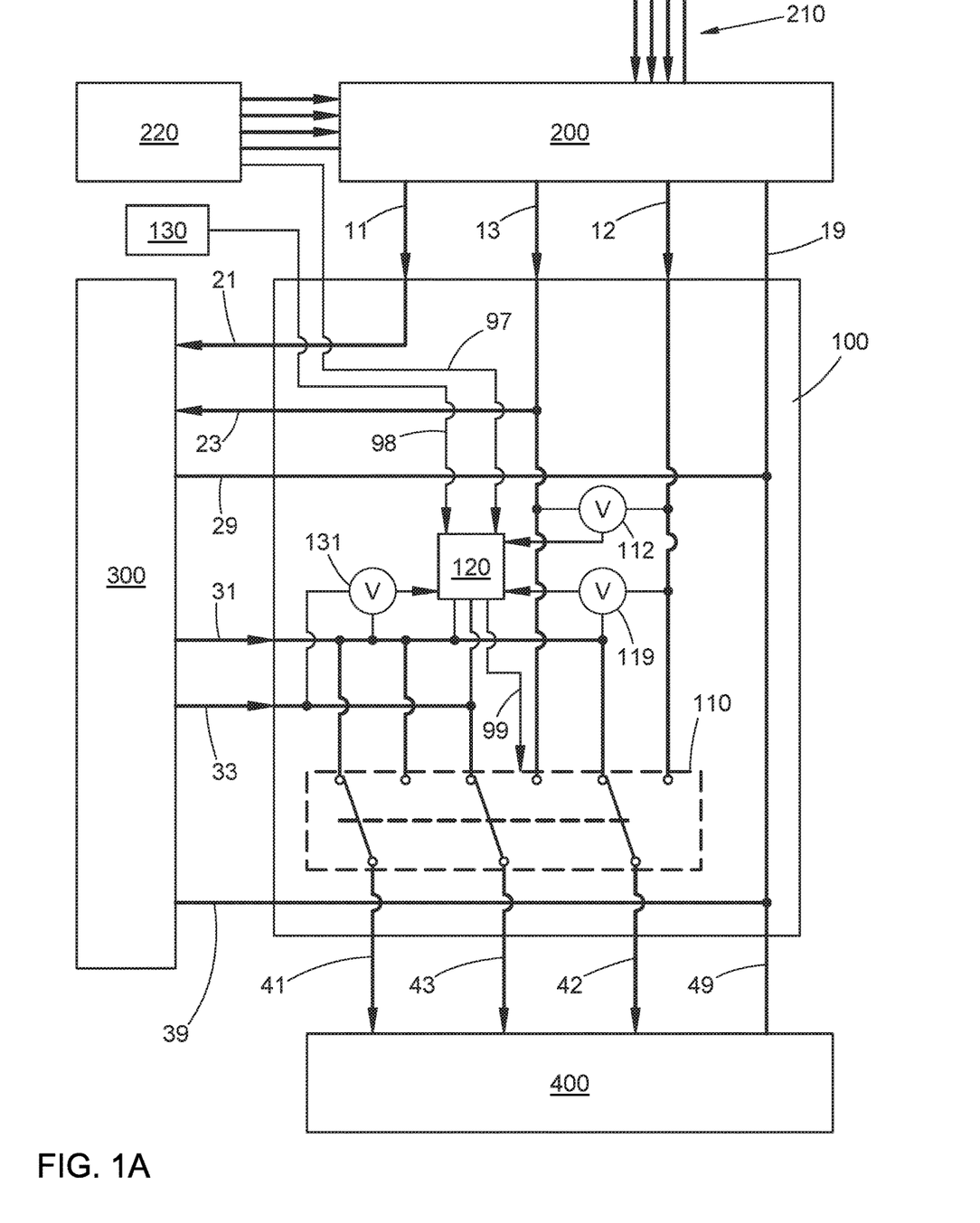
FIGS. 1A, 1B, and 1C illustrate schematically a first example embodiment of an inventive electrical switching apparatus in a cross-connected state, a parallel-connected state, and a disconnected state, respectively.
Figure 1B:
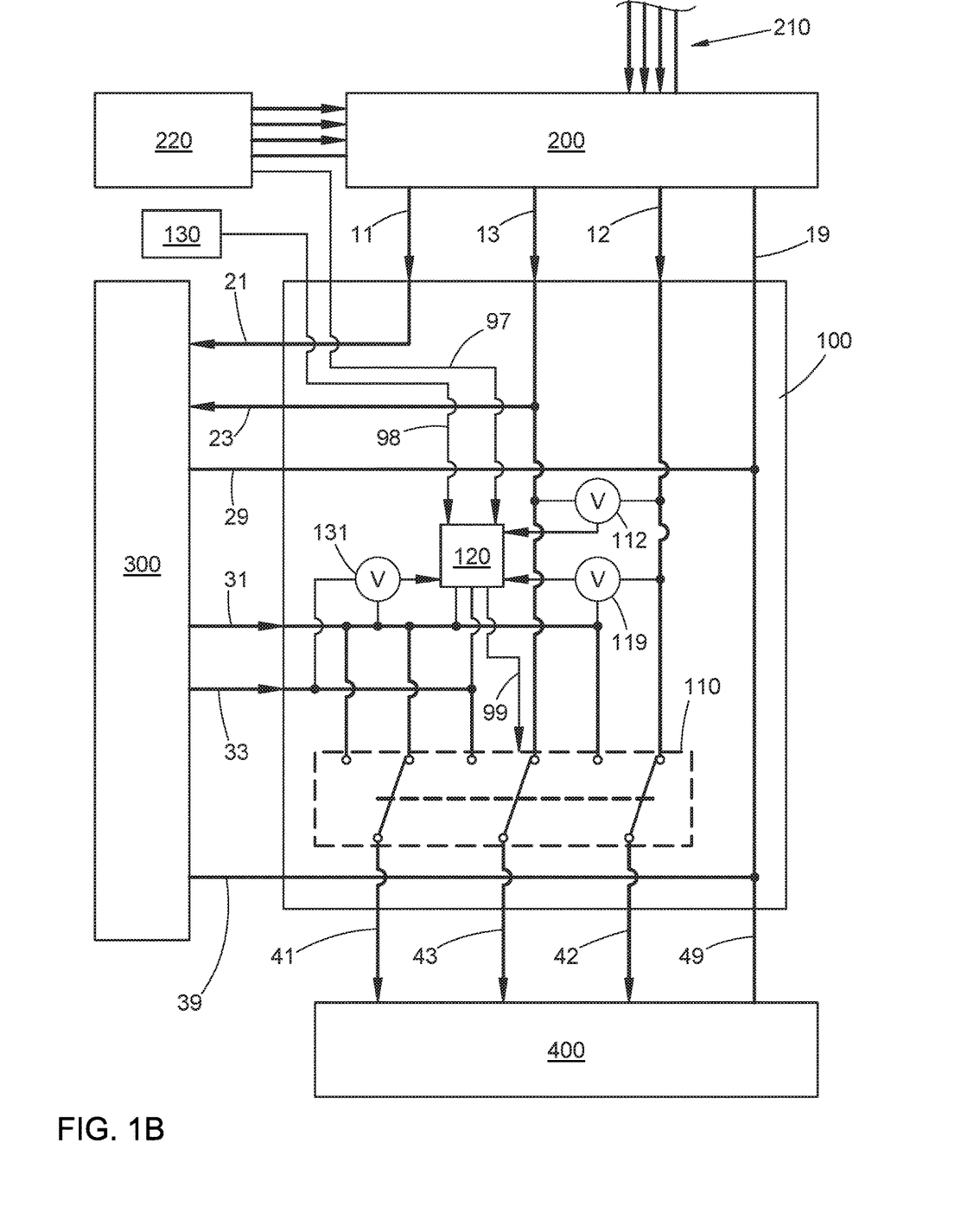

The one or more electrical relays 110 can be of any suitable number, type, or arrangement. A commonly employed type of relay is an electromagnetic relay; other types of relays can be employed, e.g., solid state relays. In a common arrangement, the one or more electrical relays 110 are structured and connected so as to be energized by power from the inverter line output connection 31; other suitable power sources for the relays 110 can be employed. A virtually endless array of different numbers or combinations of electrical relays 110 connected in various topologies can be employed to implement the cross-connected and parallel-connected states. One suitable arrangement of the one or more electrical relays 110 comprises a triple-pole-double-throw (TPDT) relay with each of the first line, second line, and neutral output connections 41/42/42 connected to a respective pole of the TPDT relay, and with each of the inverter line output, inverter neutral output, second line input, and neutral input connections 31/33/12/13 connected to one or more corresponding throws of the TPDT relay. The TPTD relay can be a single TPTD device (e.g., with 3 pole contacts, 6 throw contacts, and a control input terminal), or instead can comprise a set of three single-pole-double-throw (SPDT) relays connected together to provide the equivalent function, or can comprise any other suitable arrangement of one or more relays of one or more various types that achieves the equivalent functionality. For purposes of the present disclosure or appended claims, any relay designation (TPDT, TPTT, SPTD, and so on) shall encompass any set of one or more relays of any one or more types that are connected so as to provide the equivalent function. Either state of the TPTD relay (energized or de-energized), can correspond to the cross-connected state, with the other state of the TPTD relay (de-energized or energized) corresponding to the parallel-connected state. Which of those arrangements is chosen can depend on which state of the inventive switching apparatus 100 (cross- or parallel-connected) is the more desirable default state if power is lost, which might differ among different use environments. FIGS. 1A and 1B (without FIG. 1C) illustrate schematically the cross- and parallel-connected states, respectively, using a TPTD relay (or its functional equivalent) as the one or more relays 110.

In some examples of an inventive switching apparatus 100, the one or more relays 110 are further structured and connected so as to be switchable between at least the parallel-connected state, the cross-connected state, and a disconnected state. With the one or more relays 110 in the disconnected state, none of the first line output, second line output, or neutral output connections 41/42/43 is connected to another connection of the switching apparatus 100 (e.g., as in FIGS. 1C and 2C). Such a disconnected state might be desirable if all power is lost, indicated by an absence of AC power from the inverter line output connection 31. Accordingly, in some examples the one or more electrical relays 110 can be structured and connected so as automatically switch to or automatically remain in the disconnected state if power on the inverter line output connection 31 is lost. Instead or in addition, switching to such a disconnected state in response to an over-riding disconnect signal might be desirable in some instances. Accordingly, in some examples the control circuit 120 can be structured, programmed, or connected to set the primary control signal 99, in response to an over-riding disconnect signal, so that the one or more relays 110 remain in or switch to the disconnected state. In some examples the inventive switching apparatus 100 can include a manual switch 130 structured and connected so as to enable manual switching of the over-riding disconnect signal conveyed to the control circuit via the manual signal connection 98. In some examples the inventive switching apparatus 100 can include one or more over-current sensors or other fault sensors structured and connected so as to generate automatically the over-riding disconnect signal in response to a detected over-current condition or other fault condition.

Figure 1C:
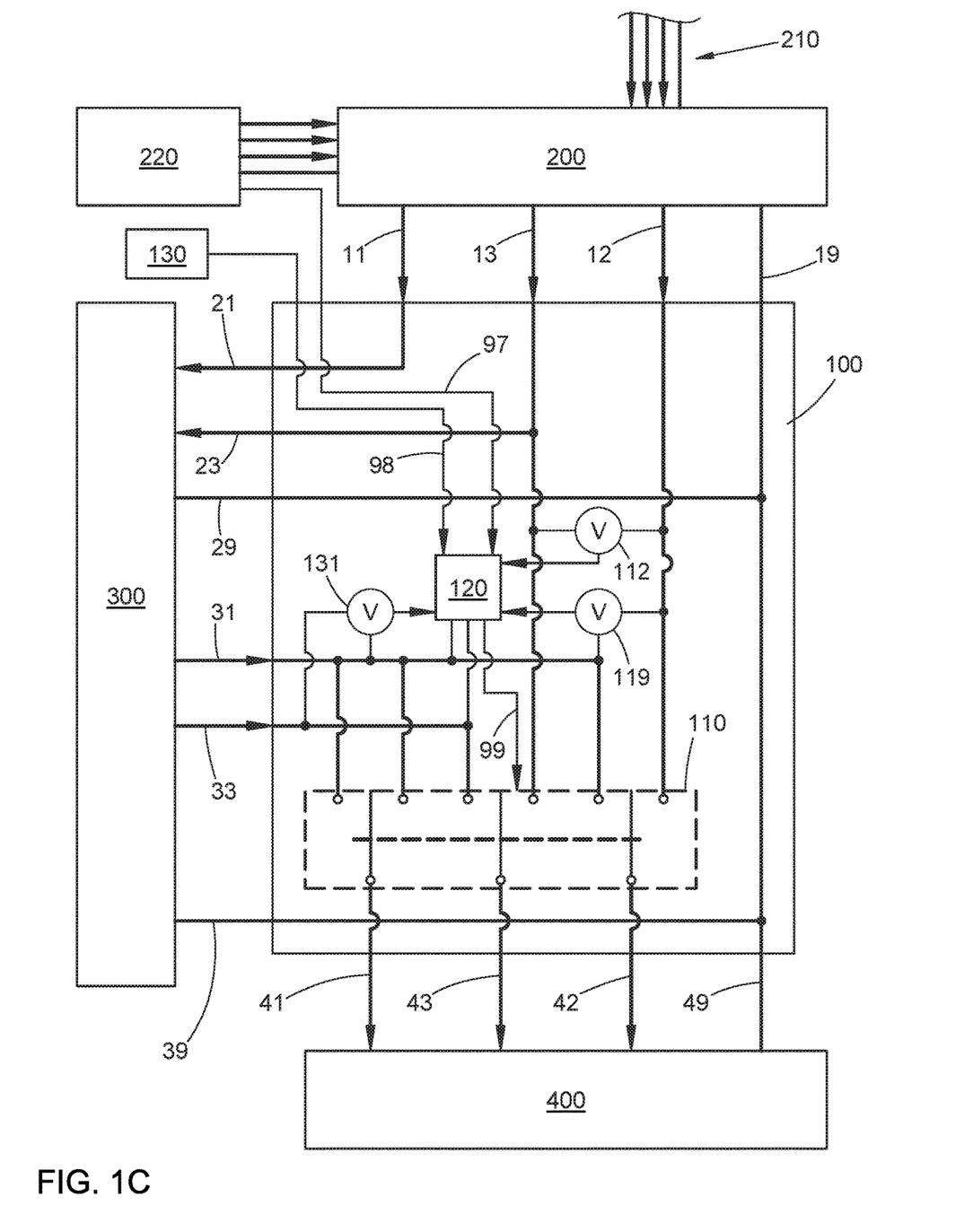
Figure 2A:
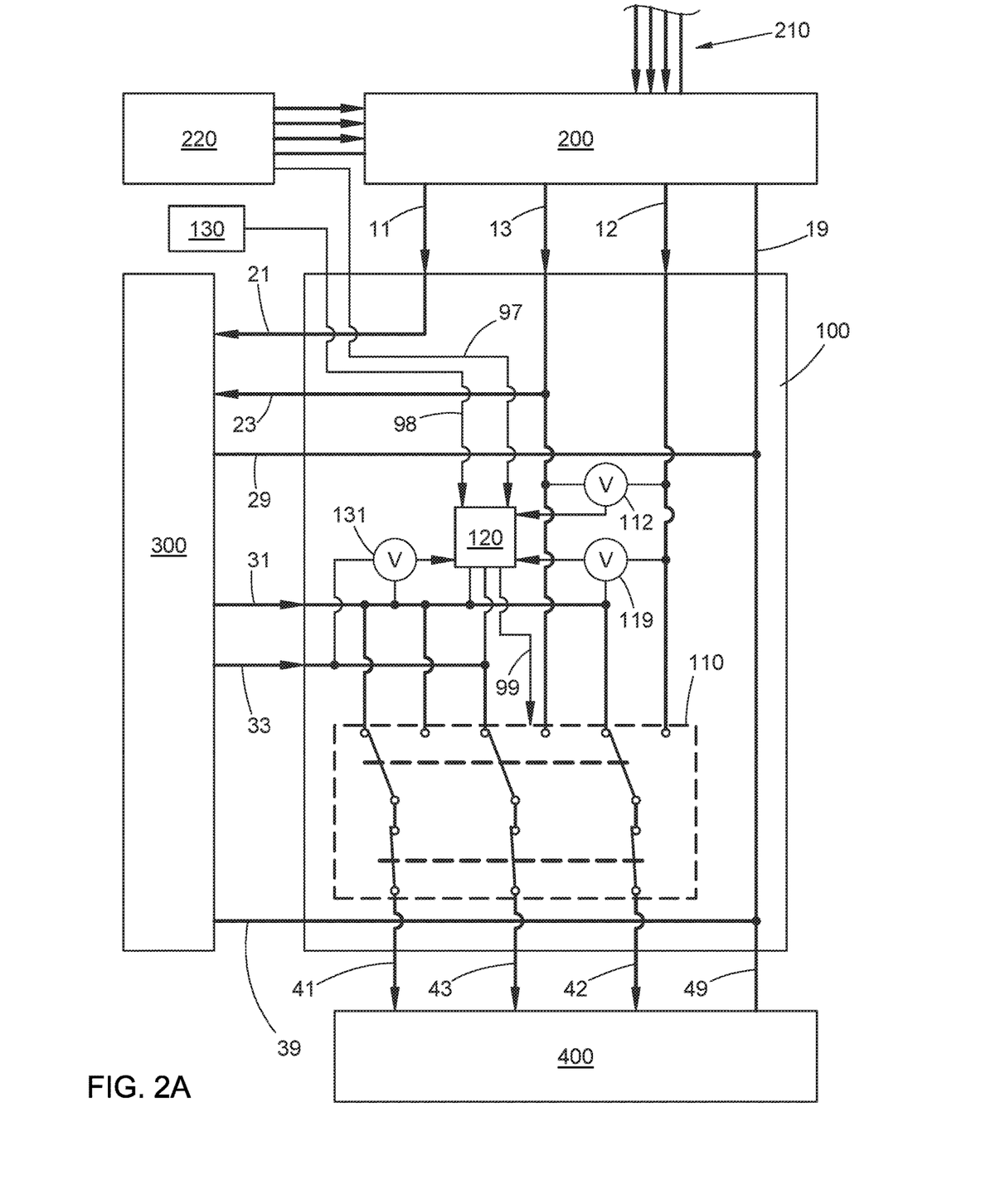
FIGS. 2A, 2B, and 2C illustrate schematically a second example embodiment of an inventive electrical switching apparatus in a cross-connected state, a parallel-connected state, and a disconnected state, respectively.
Figure 2B:
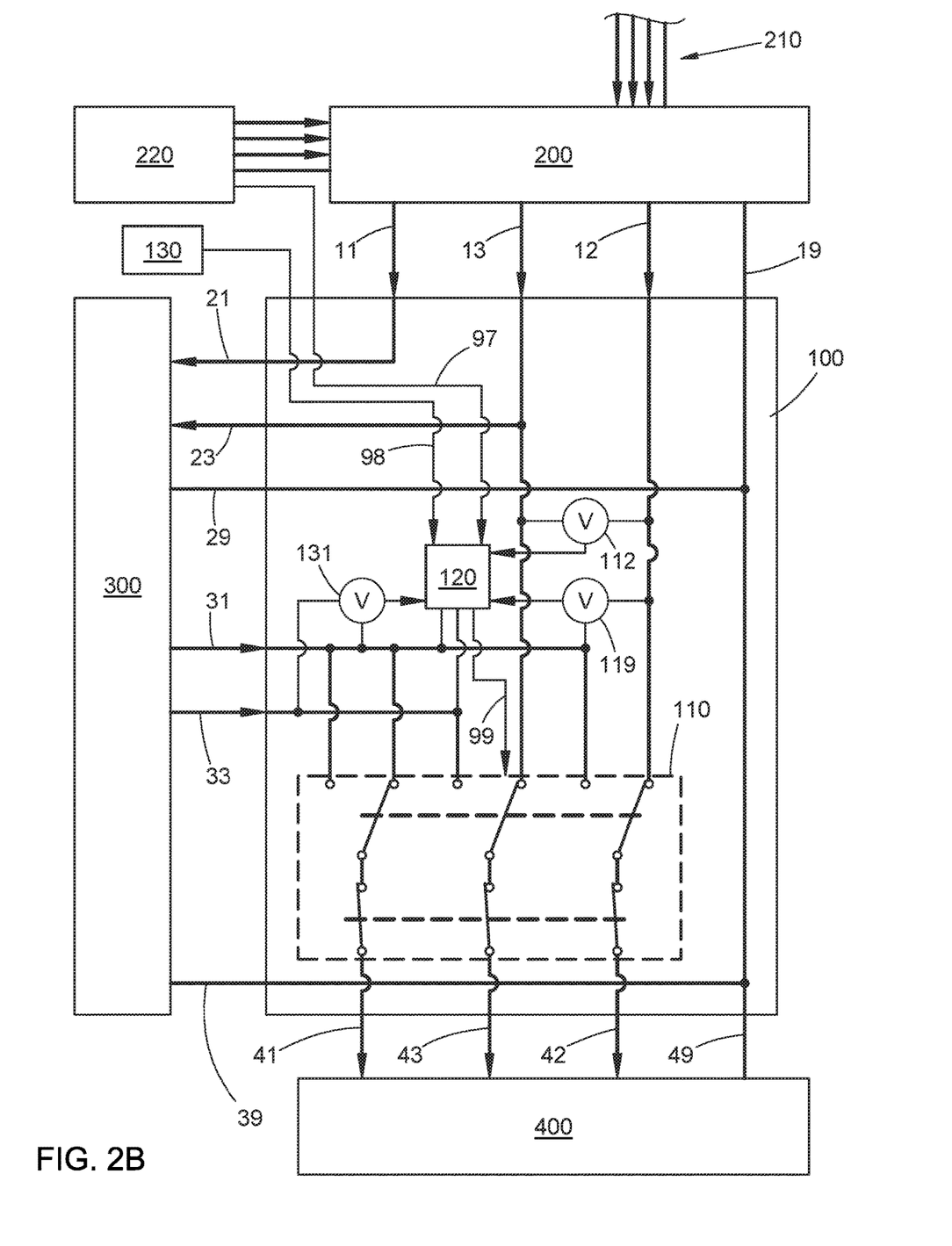
Figure 2C:
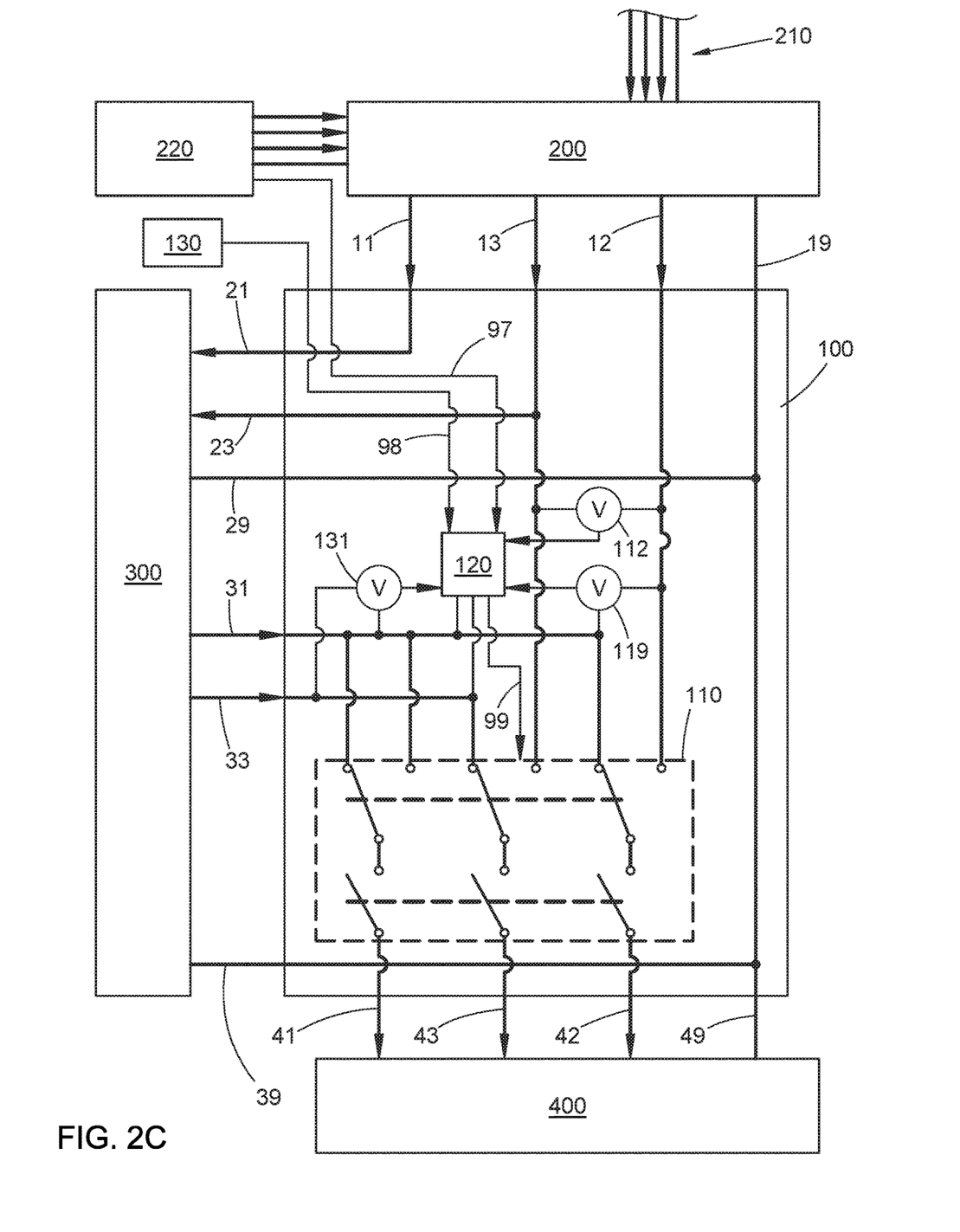

In some examples, the disconnected state can be implemented using a triple-pole-triple-throw relay (TPTT) as the one or more relays 110 (or a functionally equivalent set of one or more suitably connected relays, as described above). The first line, second line, and neutral output connections 41/42/43 are each connected to a respective pole of the TPTT, and the inverter line output, inverter neutral output, neutral input, and second line input connections 31/33/13/12/ are each connected to one or more corresponding throws of the TPTT. FIGS. 1A, 1B, and 1C together illustrate schematically that arrangement: FIG. 1A shows the cross-connected state, FIG. 1B shows the parallel-connected state, and FIG. 1C shows the disconnected state. The control circuit 120 and the TPTT can be arranged so that the over-riding signal (switched manually with the switch 130 connected via the signal connection 98, or in response to an over-current or other fault condition) results in the disconnected state. In some examples, the TPTT can be arranged so that its deenergized state corresponds to the disconnected state (the middle throw in the example shown in FIG. 1C).

In some other examples, the disconnected state can be implemented using a TPDT relay and a triple-pole-single-throw (TPST) relay as the one or more relays 110 (or a functionally equivalent set of one or more suitably connected relays, as described above). The first line, second line, and neutral output connections 41/42/43 are each connected to a respective pole or throw of the TPST, each corresponding throw or pole of the TPST (that is not connected an output connection) is connected to a respective pole of the TPDT, and the inverter line output, inverter neutral output, second line input, and neutral input connections 31/33/12/13 are each connected to one or more corresponding throws of the TPDT relay. The arrangement is illustrated schematically in FIG. 2A (cross-connected state), FIG. 2B (parallel-connected state), and FIG. 2C (disconnected state). The control circuit 120 and the TPST can be arranged so that the over-riding signal 98 (switched manually or in response to an over-current or other fault condition) results in the disconnected state. In some examples, the TPST can be arranged so that its deenergized state corresponds to the disconnected state; in such an example a TPTS-NO (normally open) would be employed (or its functional equivalent).

In a common use scenario, the first line, second line, neutral, and ground input connections 11/12/13/19 are connected to corresponding output connections of an AC power transfer switch 200. Such a transfer switch 200 enables switching between a generator 220 and an external power source 210 (e.g., grid power, sometimes referred to as "shore power" in the context of a boat or RV). In some instances the transfer switch 200 provides single phase AC power (e.g., from the electrical grid or from the generator 220); in the absence of an over-riding control signal, receiving single-phase AC power from the transfer switch 200 causes the inventive switching apparatus 100 to automatically switch to or automatically remain in the cross-connected arrangement as described above. In some instances the transfer switch 200 provides split-phase AC power (e.g., from the electrical grid or from the generator 220); in the absence of an over-riding control signal, receiving split-phase AC power from the transfer switch 200 causes the inventive switching apparatus 100 to automatically switch to or automatically remain in the parallel-connected arrangement as described above.

There may be instances in which the parallel-connected arrangement is desired even if the AC voltages on the inverter line output connection 31 and the second line input connection 12 are in phase. Many generators 220 provide their single-phase AC power output on first and second line outputs that are connected together (e.g., by running through a common circuit breaker). In those examples, the cross-connected arrangement of the inventive switching apparatus 100 would be appropriate. Some generators 220, however, provide their single-phase AC power output on first and second line output connections that are isolated from one another (e.g., by running through separate circuit breakers). In such instances it might be desirable to have the inventive switching apparatus 100 in the parallel-connected arrangement, inconsistent with its automatic operation described above. Accordingly, in some examples the control circuit 120 can be structured, programmed, or connected to set automatically the primary control signal 99, in response to an over-riding signal received from the generator 220 via the control signal connection 97, so that the one or more relays 110 automatically remain in or automatically switch to the parallel-connected state while the generator 220 is running, regardless of relative phase of AC voltages on the inverter line output connection 31 and the second line input connection 12.

The AC voltages between and on each of the inverter line output connection 31 and the second line input connection 12 can be measured or detected in any suitable way using any suitable voltage sensor or voltmeter. For purposes of the present disclosure or appended claims, a voltage measured or detected "on" a given connection refers to the voltage between that connection and a corresponding neutral connection, whereas a voltage measured or detected "between" two connections refers to just that. The detected or measured AC voltages can be used in any suitable way to determine whether AC power is available on a given connection and to determine whether the measured or detected AC voltages are in phase or in antiphase. In some examples, an AC voltage level, measured on the inverter line output connection 31 (using the AC voltmeter or voltage sensor 131 in the examples shown), that is greater than a specified single-phase AC voltage threshold level is indicative of AC power being available on the inverter line output connection 31. Similarly, an AC voltage level, measured on the second line input connection 12 (using the AC voltmeter or voltage sensor 112 in the examples shown), that is greater than the specified single-phase AC voltage threshold level is indicative of AC power being available on the second line input connection 12. Any suitable threshold can be employed that reliably distinguishes the presence of AC power on a connection from the absence of AC power on that connection; in some examples, the specified single-phase AC voltage threshold level is about 85 volts. In some examples, an AC voltage level, measured between the inverter line output and second line input connections 31/12 (using the AC voltmeter or voltage sensor 119 in the examples shown), that is greater than a specified split-phase AC voltage threshold level is indicative of AC voltages on the inverter line output and second line input connections 31/12 being substantially in antiphase with each other; such a measurement can only occur if AC power is available on both of those connections. Conversely, an AC voltage level, measured between the inverter line output and second line input connections 31/12, that is less than the specified split-phase AC voltage threshold level, is indicative, with AC power available on both the inverter line output and second line input connections 31/12 (determined, e.g., as described above), of AC voltages on the inverter line output and second line input connections 31/12 being substantially in phase with each other. Any suitable threshold can be employed that reliably distinguishes between AC power across two connections being in phase versus being in antiphase; in some examples, the specified split-phase AC voltage threshold level is about 170 volts.

It might be desirable in some instances to set the inventive switching apparatus 100 to either the cross-connected state or the parallel-connected state, regardless of the relative phase of the AC voltages on the inverter output and second line input connections 31/12. One such instance was described above (single-phase generator power delivered on isolated line connections); other instances can be imagined. Accordingly, in some examples the control circuit 120 can be structured, programmed, or connected to set the primary control signal 99, in response to an over-riding signal received from the manual switch 130 via the control signal connection 98, so that the relays 110 switch to or remain in the cross-connected state, regardless of the relative phase of AC voltages on the inverter line output and second line input connections 31/12. Instead or in addition, in some examples the control circuit 120 can be structured, programmed, or connected to set the primary control signal 99, in response to an over-riding signal received from the manual switch 130 via the control signal connection 98, so that the relays 110 switch to or remain in the parallel-connected state, regardless of the relative phase of AC voltages on the inverter line output and second line input connections 31/12.

An inventive method, employing the inventive electrical switching apparatus 100 as variously disclosed herein, comprises: (A) connecting the first line, second line, neutral, and ground input connections 11/12/13/19 to corresponding output connections of the AC power transfer switch 200; (B) connecting the first line, second line, neutral, and ground output connections 41/42/43/49 to corresponding connections of the one or more AC power distribution panels 400; and (C) connecting the inverter line, inverter neutral, and inverter ground input connections 21/23/29 to corresponding connection of the inverter 300, and connecting the inverter line, inverter neutral, and inverter ground output connections 31/33/39 to corresponding connections of the inverter 300. In some instance, the inventive switching apparatus 100 is installed as a retrofit into an existing, previously installed AC power distribution system that already includes suitably connected transfer switch 200, inverter 300, and distribution panels 400. In such a retrofit scenario, an inventive method further comprises, before performing the actions of parts (A), (B), and (C), disconnecting from one another the AC power transfer switch 200, the inverter 300, and the AC power distribution panels 400.

In addition to the preceding, the following example embodiments fall within the scope of the present disclosure or appended claims:

Example 1. An electrical switching apparatus comprising: (a) a first line input connection, a second line input connection, a neutral input connection, a ground input connection, a first line output connection, a second line output connection, a neutral output connection, and a ground output connection connected to the ground input connection; (b) an inverter line input connection connected to the first line input connection, an inverter neutral input connection connected to the neutral input connection, and an inverter ground input connection connected to the ground input connection, an inverter line output connection, an inverter neutral output connection, and an inverter ground output connection connected to the ground output connection; (c) one or more electrical relays structured and connected so as to be switchable, in response to a primary control signal, between at least a parallel-connected state and a cross-connected state; and (d) a control circuit structured, programmed, and connected (i) to detect or measure AC voltages between and on each of the inverter line output connection and the second line input connection, (ii) to set automatically, in the absence of any contrary over-riding control signal, in response to measured or detected AC voltages that indicate that AC power is available on the inverter line output connection but unavailable on the second line input connection, the primary control signal at a corresponding signal level that results in the one or more electrical relays automatically switching to or automatically remaining in the cross-connected state, (iii) to set automatically, in the absence of any contrary over-riding control signal, in response to measured or detected AC voltages that indicate that AC power is available on both the inverter line output connection and the second line input connection and that respective AC voltages on the inverter line output connection and the second line input connection are substantially in phase with each other, the primary control signal at a corresponding signal level that results in the one or more electrical relays automatically switching to or automatically remaining in the cross-connected state, and (iv) to set automatically, in the absence of any contrary over-riding control signal, in response to detected or measured AC voltages that indicate AC power is available on both the inverter line output connection and the second line input connection and that respective AC voltages on the inverter line output connection and the second line input connection are substantially in antiphase with each other, the primary control signal at a corresponding signal level that results in the one or more electrical relays automatically switching to or automatically remaining in the parallel-connected state, wherein the one or more electrical relays are structured and connected so that: (e) with the one or more electrical relays in the cross-connected state, the one or more electrical relays (i) connect the inverter line output connection to the first line output connection, (ii) connect the inverter line output connection to the second line output connection, (iii) connect the inverter neutral output connection to the neutral output connection, and (iv) isolate the second line input connection from the second line output connection; and (f) with the one or more electrical relays in the parallel-connected state, the one or more electrical relays (i) connect the inverter line output connection to the first line output connection, (ii) connect the second line input connection to the second line output connection, (iii) connect the neutral output connection to the neutral input connection or to the inverter neutral connection, and (iv) isolate the first line output connection from the second line output connection.

Example 2. The electrical switching apparatus of Example 1 wherein, with the one or more electrical relays in the parallel-connected state, the one or more electrical relays connect the neutral output connection to the neutral input connection.

Example 3. The electrical switching apparatus of any one of Examples 1 or 2 wherein the control circuit is structured and connected so as to draw power from the inverter line output connection.

Example 4. The electrical switching apparatus of any one of Examples 1 through 3 wherein the one or more electrical relays are structured and connected so as to be energized by power from the inverter line output connection.

Example 5. The electrical switching apparatus of any one of Examples 1 through 4 wherein (i) the one or more electrical relays are further structured and connected so as to be switchable between at least the parallel-connected state, the cross-connected state, and a disconnected state, (ii) the one or more electrical relays are further structured or connected so as to automatically switch to or automatically remain in the disconnected state in the absence of AC power from the inverter line output connection, and (iii) with the one or more electrical relays in the disconnected state, none of the first line output, second line output, or neutral output connections is connected to another connection of the switching apparatus.

Example 6. The electrical switching apparatus of any one of Examples 1 through 5 wherein (i) the one or more electrical relays are further structured and connected so as to be switchable, in response to the primary control signal, between at least the parallel-connected state, the cross-connected state, and a disconnected state, (ii) the control circuit is further structured, programmed, or connected to set, in response to an over-riding disconnect signal, the primary control signal to a corresponding signal level that results in the one or more electrical relays switching to or remaining in the disconnected state, and (iii) with the one or more electrical relays in the disconnected state, none of the first line output, second line output, or neutral output connections is connected to another connection of the switching apparatus.

Example 7. The electrical switching apparatus of Example 6 further comprising a manual switch structured and connected so as to enable manual switching of the over-riding disconnect signal.

Example 8. The electrical switching apparatus of any one of Examples 6 or 7 further comprising one or more sensors structured and connected so as to generate automatically the over-riding disconnect signal in response to a detected over-current condition or fault condition.

Example 9. The electrical switching apparatus of any one of Examples 5 through 8 wherein (i) the one or more electrical relays includes a TPTT relay, (ii) the first line, second line, and neutral output connections are each connected to a respective pole of the TPTT, (iii) the inverter line output, inverter neutral output, neutral input, and second line input connections are each connected to one or more corresponding throws of the TPTT, and (iv) with the TPTT in a deenergized state, the one or more electrical relays are in the disconnected state.

Example 10. The electrical switching apparatus of any one of Examples 5 through 8 wherein (i) the one or more electrical relays includes a TPDT relay and a TPST-NO relay, (ii) the first line, second line, and neutral output connections are each connected to a respective pole or throw of the TPST-NO, (iii) each pole of the TPDT relay is connected to a respective throw or pole of the TPST-NO that is not connected an output connection, and (iv) the inverter line output, inverter neutral output, second line input, and neutral input connections are each connected to one or more corresponding throws of the TPDT relay.

Example 11. The electrical switching apparatus of any one of Examples 1 through 8 wherein (i) the one or more electrical relays includes a TPDT relay, (ii) the first line, second line, and neutral output connections are each connected to a respective pole of the TPDT relay, and (iii) the inverter line output, inverter neutral output, second line input, and neutral input connections are each connected to one or more corresponding throws of the TPDT relay.

Example 12. The electrical switching apparatus of any one of Examples 1 through 11 wherein the first line, second line, neutral, and ground input connections are connected to corresponding output connections of an AC power transfer switch that is structured and connected (i) to convey from an external power source single phase AC electrical power to both the first and second line input connections with corresponding AC voltages on the first and second line input connections substantially in phase with each other, (ii) to convey from an external power source split-phase AC electrical power to the first and second line input connections with corresponding AC voltages on the first and second input connection substantially in antiphase with each other, or (iii) to convey from an electric generator single phase AC electrical power to the first line input connection and single phase AC electrical power to the second line input connection.

Example 13. The electrical switching apparatus of Example 12 further comprising the AC power transfer switch.

Example 14. The electrical switching apparatus of any one of Examples 12 or 13 wherein the control circuit is further structured, programmed, or connected to set automatically, in response to an over-riding control signal received from the generator, the primary control signal to the corresponding signal level that results in the one or more electrical relays automatically switching to or automatically remaining in the parallel-connected state, regardless of relative phase of AC voltages on the inverter line output connection and the second line input connection.

Example 15. The electrical switching apparatus of any one of Examples 1 through 14 wherein the inverter line, neutral, and ground input connections and the inverter line, neutral, and ground output connections are connected to corresponding input and output connections of an inverter.

Example 16. The electrical switching apparatus of Example 15 further comprising the inverter.

Example 17. The electrical switching apparatus of any one of Examples 15 or 16 wherein the inverter is a pass-through inverter.

Example 18. The electrical switching apparatus of any one of Examples 1 through 17 wherein the first line, second line, neutral, and ground output connections are connected to corresponding connections of one or more AC power distribution panels.

Example 19. The electrical switching apparatus of Example 18 further comprising the one or more AC power distribution panels.

Example 20. The electrical switching apparatus of any one of Examples 18 or 19 wherein (i) the first line, neutral, and ground output connections are connected to corresponding connections of a first subset of one or more AC power distribution panels, and (ii) the second line, neutral, and ground output connections are connected to corresponding connections of a second subset of one or more AC power distribution panels that are functionally distinct from the AC power distribution panels of the first subset.

Example 21. The electrical switch apparatus of any one of Examples 1 through 20 further comprising one or more of: (i) a voltage sensor or voltmeter connected so as to detect or measure AC voltage across the inverter line and neutral output connections, and connected to the control circuit so as to provide thereto a corresponding signal indicative of the corresponding detected or measured voltage; (ii) a voltage sensor or voltmeter connected so as to detect or measure AC voltage across the neutral and second line input connections, and connected to the control circuit so as to provide thereto a corresponding signal indicative of the corresponding detected or measured voltage; or (iii) a voltage sensor or voltmeter connected so as to detect or measure AC voltage across the inverter line output connection and the second line input connection, and connected to the control circuit so as to provide thereto a corresponding signal indicative of the corresponding detected or measured voltage, wherein (iv) the control circuit is structured, connected, and programmed to receive one or more of the measured voltages and determine therefrom a corresponding level of the primary control signal.

Example 22. The electrical switching apparatus of any one of Examples 1 through 21 wherein (i) an AC voltage level, measured on the inverter line output connection, that is greater than a specified single-phase AC voltage threshold level is indicative of AC power being available on the inverter line output connection, and (ii) an AC voltage level, measured on the second line input connection, that is greater than the specified single-phase AC voltage threshold level is indicative of AC power being available on the second line input connection.

Example 23. The electrical switching apparatus of Example 22 wherein the specified single-phase AC voltage threshold level is about 85 volts.

Example 24. The electrical switching apparatus of any one of Examples 1 through 23 wherein (i) an AC voltage level, measured between the inverter line output and second line input connections, that is greater than a specified split-phase AC voltage threshold level is indicative of AC voltages on the inverter line output connection and the second line input connection being substantially in antiphase with each other, and (ii) an AC voltage level, measured between the inverter line output and second line input connections, that is less than the specified split-phase AC voltage threshold level, is indicative, with AC power available on both the inverter line output connection and the second line input connection, of AC voltages on the inverter line output connection and the second line input connection being substantially in phase with each other.

Example 25. The electrical switching apparatus of Example 24 wherein the specified split-phase AC voltage threshold level is about 170 volts.

Example 26. The electrical switching apparatus of any one of Examples 1 through 25 wherein the control circuit is further structured, programmed, or connected to set, in response to an over-riding control signal received from a manually actuated control, the primary control signal to the corresponding signal level that results in the one or more electrical relays switching to or remaining in the parallel-connected state, regardless of relative phase of AC voltages on the inverter line output connection and the second line input connection.

Example 27. The electrical switching apparatus of any one of Examples 1 through 26 wherein the control circuit is further structured, programmed, or connected to set, in response to an over-riding control signal received from a manually actuated control, the primary control signal to the corresponding signal level that results in the one or more electrical relays switching to or remaining in the cross-connected state, regardless of relative phase of AC voltages on the inverter line output connection and the second line input connection.

Example 28. A method employing the electrical switching apparatus of any one of Examples 1 through 27, the method comprising: (A) connecting the first line, second line, neutral, and ground input connections to corresponding output connections of an AC power transfer switch; (B) connecting the first line, second line, neutral, and ground output connections to corresponding connections of one or more AC power distribution panels; and (C) connecting the inverter line, inverter neutral, and inverter ground input connections to corresponding connection of an inverter, and connecting the inverter line, inverter neutral, and inverter ground output connections to corresponding connections of the inverter.

Example 29. The method of Example 28 wherein the AC power transfer switch, the inverter, and the one or more AC power distribution panels are components of a previously installed AC power system, the method further comprising, before performing the actions of parts (A), (B), and (C), disconnecting from one another the AC power transfer switch, the inverter, and the one or more AC power distribution panels.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. Similarly, "one or more of a dog or a cat" would be interpreted as including (i) one or more dogs without any cats, (ii) one or more cats without any dogs, or (iii) one or more dogs and one or more cats, unless explicitly stated otherwise or the alternatives are understood or disclosed (implicitly or explicitly) to be mutually exclusive or incompatible. Similarly, "one or more of a dog, a cat, or a mouse" would be interpreted as (i) one or more dogs without any cats or mice, (ii) one or more cats without and dogs or mice, (iii) one or more mice without any dogs or cats, (iv) one or more dogs and one or more cats without any mice, (v) one or more dogs and one or more mice without any cats, (vi) one or more cats and one or more mice without any dogs, or (vii) one or more dogs, one or more cats, and one or more mice. "Two or more of a dog, a cat, or a mouse" would be interpreted as (i) one or more dogs and one or more cats without any mice, (ii) one or more dogs and one or more mice without any cats, (iii) one or more cats and one or more mice without and dogs, or (iv) one or more dogs, one or more cats, and one or more mice; "three or more," "four or more," and so on would be analogously interpreted. For any of the preceding recitations, if any pairs or combinations of the included alternatives are understood or disclosed (implicitly or explicitly) to be incompatible or mutually exclusive, such pairs or combinations are understood to be excluded from the corresponding recitation. For purposes of the present disclosure and appended claims, the words "comprising," "including," "having," and variants thereof, wherever they appear, shall be construed as open ended terminology, with the same meaning as if a phrase such as "at least" were appended after each instance thereof, unless explicitly stated otherwise.

For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An electrical switching apparatus comprising:
   (a) a first line input connection, a second line input connection, a neutral input connection, a ground input connection, a first line output connection, a second line output connection, a neutral output connection, and a ground output connection connected to the ground input connection;
   (b) an inverter line input connection connected to the first line input connection, an inverter neutral input connection connected to the neutral input connection, and an inverter ground input connection connected to the ground input connection, an inverter line output connection, an inverter neutral output connection, and an inverter ground output connection connected to the ground output connection;
   (c) one or more electrical relays structured and connected so as to be switchable, in response to a primary control signal, between at least a parallel-connected state and a cross-connected state; and
   (d) a control circuit structured, programmed, and connected
      (i) to detect or measure AC voltages between and on each of the inverter line output connection and the second line input connection,
      (ii) to set automatically, in the absence of any contrary over-riding control signal, in response to measured or detected AC voltages that indicate that AC power is available on the inverter line output connection but unavailable on the second line input connection, the primary control signal at a corresponding signal level that results in the one or more electrical relays automatically switching to or automatically remaining in the cross-connected state,
      (iii) to set automatically, in the absence of any contrary over-riding control signal, in response to measured or detected AC voltages that indicate that AC power is available on both the inverter line output connection and the second line input connection and that respective AC voltages on the inverter line output connection and the second line input connection are substantially in phase with each other, the primary control signal at a corresponding signal level that results in the one or more electrical relays automatically switching to or automatically remaining in the cross-connected state, and
      (iv) to set automatically, in the absence of any contrary over-riding control signal, in response to detected or measured AC voltages that indicate AC power is available on both the inverter line output connection and the second line input connection and that respective AC voltages on the inverter line output connection and the second line input connection are substantially in antiphase with each other, the primary control signal at a corresponding signal level that results in the one or more electrical relays automatically switching to or automatically remaining in the parallel-connected state, wherein the one or more electrical relays are structured and connected so that:

(e) with the one or more electrical relays in the cross-connected state, the one or more electrical relays (i) connect the inverter line output connection to the first line output connection, (ii) connect the inverter line output connection to the second line output connection, (iii) connect the inverter neutral output connection to the neutral output connection, and (iv) isolate the second line input connection from the second line output connection; and (f) with the one or more electrical relays in the parallel-connected state, the one or more electrical relays (i) connect the inverter line output connection to the first line output connection, (ii) connect the second line input connection to the second line output connection, (iii) connect the neutral output connection to the neutral input connection or to the inverter neutral connection, and (iv) isolate the first line output connection from the second line output connection.

2. The electrical switching apparatus of claim 1 wherein, with the one or more electrical relays in the parallel-connected state, the one or more electrical relays connect the neutral output connection to the neutral input connection.

3. The electrical switching apparatus of claim 1 wherein the control circuit is structured and connected so as to draw power from the inverter line output connection.

4. The electrical switching apparatus of claim 1 wherein the one or more electrical relays are structured and connected so as to be energized by power from the inverter line output connection.

5. The electrical switching apparatus of claim 1 wherein (i) the one or more electrical relays are further structured and connected so as to be switchable between at least the parallel-connected state, the cross-connected state, and a disconnected state, (ii) the one or more electrical relays are further structured or connected so as to automatically switch to or automatically remain in the disconnected state in the absence of AC power from the inverter line output connection, and (iii) with the one or more electrical relays in the disconnected state, none of the first line output, second line output, or neutral output connections is connected to another connection of the switching apparatus.

6. The electrical switching apparatus of claim 5 wherein (i) the one or more electrical relays includes a TPTT relay, (ii) the first line, second line, and neutral output connections are each connected to a respective pole of the TPTT, (iii) the inverter line output, inverter neutral output, neutral input, and second line input connections are each connected to one or more corresponding throws of the TPTT, and (iv) with the TPTT in a deenergized state, the one or more electrical relays are in the disconnected state.

7. The electrical switching apparatus of claim 5 wherein (i) the one or more electrical relays includes a TPDT relay and a TPST-NO relay, (ii) the first line, second line, and neutral output connections are each connected to a respective pole or throw of the TPST-NO, (iii) each pole of the TPDT relay is connected to a respective throw or pole of the TPST-NO that is not connected an output connection, and (iv) the inverter line output, inverter neutral output, second line input, and neutral input connections are each connected to one or more corresponding throws of the TPDT relay.

8. The electrical switching apparatus of claim 1 wherein (i) the one or more electrical relays are further structured and connected so as to be switchable, in response to the primary control signal, between at least the parallel-connected state, the cross-connected state, and a disconnected state, (ii) the control circuit is further structured, programmed, or connected to set, in response to an over-riding disconnect signal, the primary control signal to a corresponding signal level that results in the one or more electrical relays switching to or remaining in the disconnected state, and (iii) with the one or more electrical relays in the disconnected state, none of the first line output, second line output, or neutral output connections is connected to another connection of the switching apparatus.

9. The electrical switching apparatus of claim 8 further comprising a manual switch structured and connected so as to enable manual switching of the over-riding disconnect signal.

10. The electrical switching apparatus of claim 8 further comprising one or more sensors structured and connected so as to generate automatically the over-riding disconnect signal in response to a detected over-current condition or fault condition.

11. The electrical switching apparatus of claim 1 wherein (i) the one or more electrical relays includes a TPDT relay, (ii) the first line, second line, and neutral output connections are each connected to a respective pole of the TPDT relay, and (iii) the inverter line output, inverter neutral output, second line input, and neutral input connections are each connected to one or more corresponding throws of the TPDT relay.

12. The electrical switching apparatus of claim 1 wherein the first line, second line, neutral, and ground input connections are connected to corresponding output connections of an AC power transfer switch that is structured and connected (i) to convey from an external power source single phase AC electrical power to both the first and second line input connections with corresponding AC voltages on the first and second line input connections substantially in phase with each other, (ii) to convey from an external power source split-phase AC electrical power to the first and second line input connections with corresponding AC voltages on the first and second input connection substantially in antiphase with each other, or (iii) to convey from an electric generator single phase AC electrical power to the first line input connection and single phase AC electrical power to the second line input connection.

13. The electrical switching apparatus of claim 12 further comprising the AC power transfer switch.

14. The electrical switching apparatus of claim 12 wherein the control circuit is further structured, programmed, or connected to set automatically, in response to an over-riding control signal received from the generator, the primary control signal to the corresponding signal level that results in the one or more electrical relays automatically switching to or automatically remaining in the parallel-connected state, regardless of relative phase of AC voltages on the inverter line output connection and the second line input connection.

15. The electrical switching apparatus of claim 1 wherein the inverter line, neutral, and ground input connections and the inverter line, neutral, and ground output connections are connected to corresponding input and output connections of an inverter.

16. The electrical switching apparatus of claim 15 further comprising the inverter.

17. The electrical switching apparatus of claim 15 wherein the inverter is a pass-through inverter.

18. The electrical switching apparatus of claim 1 wherein the first line, second line, neutral, and ground output connections are connected to corresponding connections of one or more AC power distribution panels.

19. The electrical switching apparatus of claim 18 further comprising the one or more AC power distribution panels.

20. The electrical switching apparatus of claim 18 wherein (i) the first line, neutral, and ground output connections are connected to corresponding connections of a first subset of one or more AC power distribution panels, and (ii) the second line, neutral, and ground output connections are connected to corresponding connections of a second subset of one or more AC power distribution panels that are functionally distinct from the AC power distribution panels of the first subset.

21. The electrical switch apparatus of claim 1 further comprising one or more of: (i) a voltage sensor or voltmeter connected so as to detect or measure AC voltage across the inverter line and neutral output connections, and connected to the control circuit so as to provide thereto a corresponding signal indicative of the corresponding detected or measured voltage; (ii) a voltage sensor or voltmeter connected so as to detect or measure AC voltage across the neutral and second line input connections, and connected to the control circuit so as to provide thereto a corresponding signal indicative of the corresponding detected or measured voltage; or (iii) a voltage sensor or voltmeter connected so as to detect or measure AC voltage across the inverter line output connection and the second line input connection, and connected to the control circuit so as to provide thereto a corresponding signal indicative of the corresponding detected or measured voltage, wherein (iv) the control circuit is structured, connected, and programmed to receive one or more of the measured voltages and determine therefrom a corresponding level of the primary control signal.

22. The electrical switching apparatus of claim 1 wherein (i) an AC voltage level, measured on the inverter line output connection, that is greater than a specified single-phase AC voltage threshold level is indicative of AC power being available on the inverter line output connection, and (ii) an AC voltage level, measured on the second line input connection, that is greater than the specified single-phase AC voltage threshold level is indicative of AC power being available on the second line input connection.

23. The electrical switching apparatus of claim 22 wherein the specified single-phase AC voltage threshold level is about 85 volts.

24. The electrical switching apparatus of claim 1 wherein (i) an AC voltage level, measured between the inverter line output and second line input connections, that is greater than a specified split-phase AC voltage threshold level is indicative of AC voltages on the inverter line output connection and the second line input connection being substantially in antiphase with each other, and (ii) an AC voltage level, measured between the inverter line output and second line input connections, that is less than the specified split-phase AC voltage threshold level, is indicative, with AC power available on both the inverter line output connection and the second line input connection, of AC voltages on the inverter line output connection and the second line input connection being substantially in phase with each other.

25. The electrical switching apparatus of claim 24 wherein the specified split-phase AC voltage threshold level is about 170 volts.

26. The electrical switching apparatus of claim 1 wherein the control circuit is further structured, programmed, or connected to set, in response to an over-riding control signal received from a manually actuated control, the primary control signal to the corresponding signal level that results in the one or more electrical relays switching to or remaining in the parallel-connected state, regardless of relative phase of AC voltages on the inverter line output connection and the second line input connection.

27. The electrical switching apparatus of claim 1 wherein the control circuit is further structured, programmed, or connected to set, in response to an over-riding control signal received from a manually actuated control, the primary control signal to the corresponding signal level that results in the one or more electrical relays switching to or remaining in the cross-connected state, regardless of relative phase of AC voltages on the inverter line output connection and the second line input connection.

28. A method employing the electrical switching apparatus of claim 1, the method comprising:
(A) connecting the first line, second line, neutral, and ground input connections to corresponding output connections of an AC power transfer switch;
(B) connecting the first line, second line, neutral, and ground output connections to corresponding connections of one or more AC power distribution panels; and
(C) connecting the inverter line, inverter neutral, and inverter ground input connections to corresponding connection of an inverter, and connecting the inverter line, inverter neutral, and inverter ground output connections to corresponding connections of the inverter.

29. The method of claim 28 wherein the AC power transfer switch, the inverter, and the one or more AC power distribution panels are components of a previously installed AC power system, the method further comprising, before performing the actions of parts (A), (B), and (C), disconnecting from one another the AC power transfer switch, the inverter, and the one or more AC power distribution panels.

* * * * *

UNITED STATES PATENT AND TRADEMARK OFFICE
CERTIFICATE OF CORRECTION

| | |
|---|---|
| PATENT NO. | : 11,128,140 B2 |
| APPLICATION NO. | : 16/994571 |
| DATED | : September 21, 2021 |
| INVENTOR(S) | : Mitchell J Boyer |

It is certified that error appears in the above-identified patent and that said Letters Patent is hereby corrected as shown below:

In the Claims

In Claim 7 (Column 17 Line 62):
Please insert --to-- between "connected" and "an"

In Claim 12 (Column 18 Line 42):
Please replace "connection" with --connections--

Signed and Sealed this
Eleventh Day of June, 2024

Katherine Kelly Vidal
*Director of the United States Patent and Trademark Office*